UNITED STATES PATENT OFFICE.

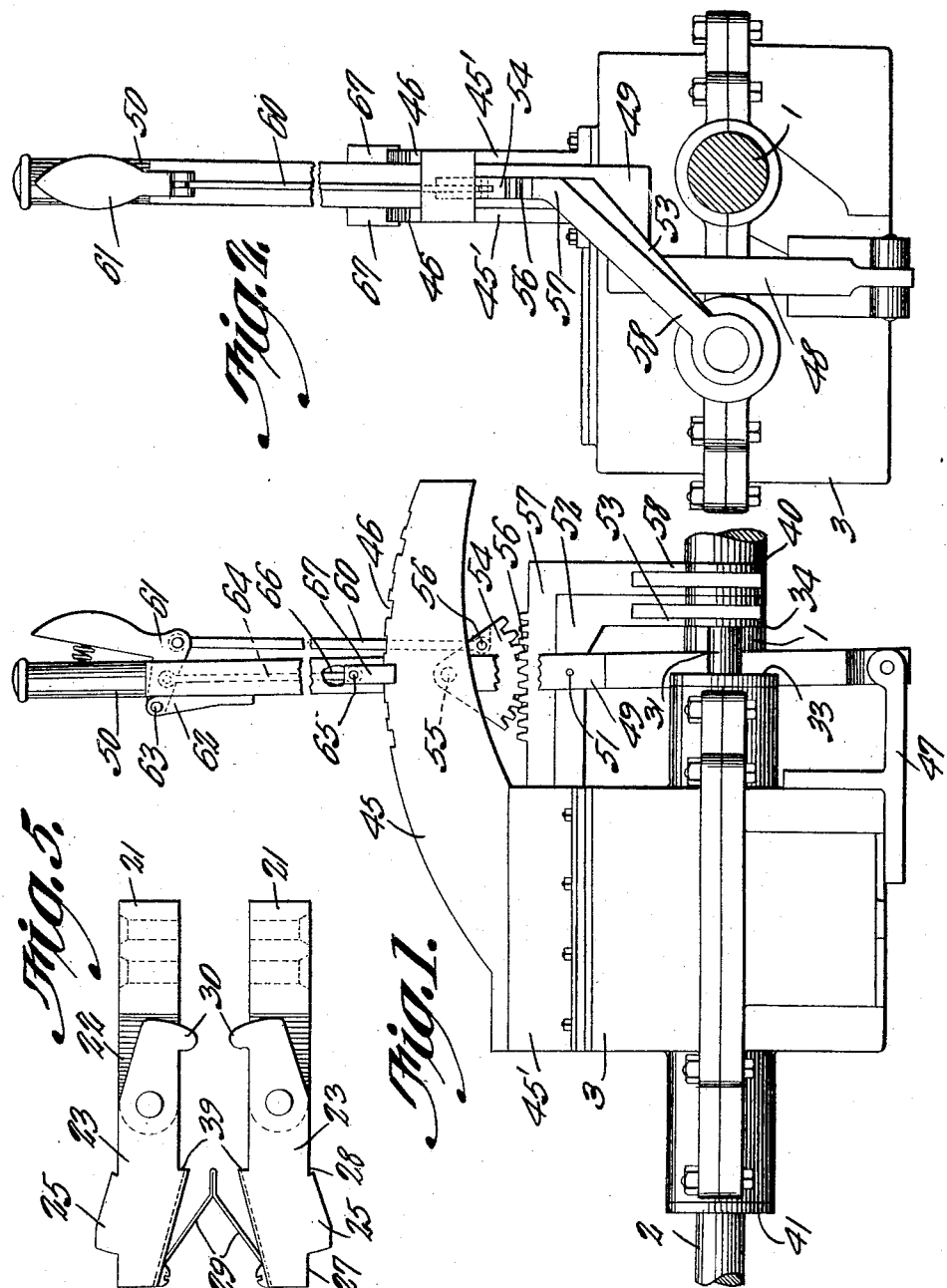

ARTHUR R. ROGERS, OF JONESPORT, MAINE.

SELECTIVE TRANSMISSION MECHANISM.

1,109,305. Specification of Letters Patent. Patented Sept. 1, 1914.

Application filed March 31, 1913. Serial No. 757,984.

*To all whom it may concern:*

Be it known that I, ARTHUR R. ROGERS, a citizen of the United States, residing at Jonesport, in the county of Washington and State of Maine, have invented a new and useful Selective Transmission Mechanism, of which the following is a specification.

The present invention relates to improvements in selective transmission mechanism, one object of the present invention being the provision of a transmission mechanism in which various speeds and reverse may be properly selected, without the necessity of a successive action from one power transmitting means to the other, there being provided means for removing the connecting member so that the same may be moved to the desired selected point before the release thereof, the release thereof automatically causing the engagement of such means through the selected power transmitting element.

A further object of the present invention is to provide an efficient means for locking the retracting device, whereby the same may not be projected until it has been moved to the selected position.

A still further object of the present invention is the provision of a selective transmission in which the parts are so mounted, as to prevent the usual gear tearing as in the present form of transmission gear, and in which the moving parts are so mounted as to be readily accessible for adjustment and repair.

A still further object of the invention is the provision of a transmission mechanism which is readily connected between the driving shaft, as for instance, the clutch controlled shaft of an explosive engine, and a driven shaft, such driven shaft being disposed in axial alinement with the driving shaft and connected in an automobile structure through the differential gearing to the rear axle, there being provided a counter shaft having disposed thereupon the respective selective power transmitting elements which are connected at all times with the fixed power transmitting elements of the driven shaft.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 3:
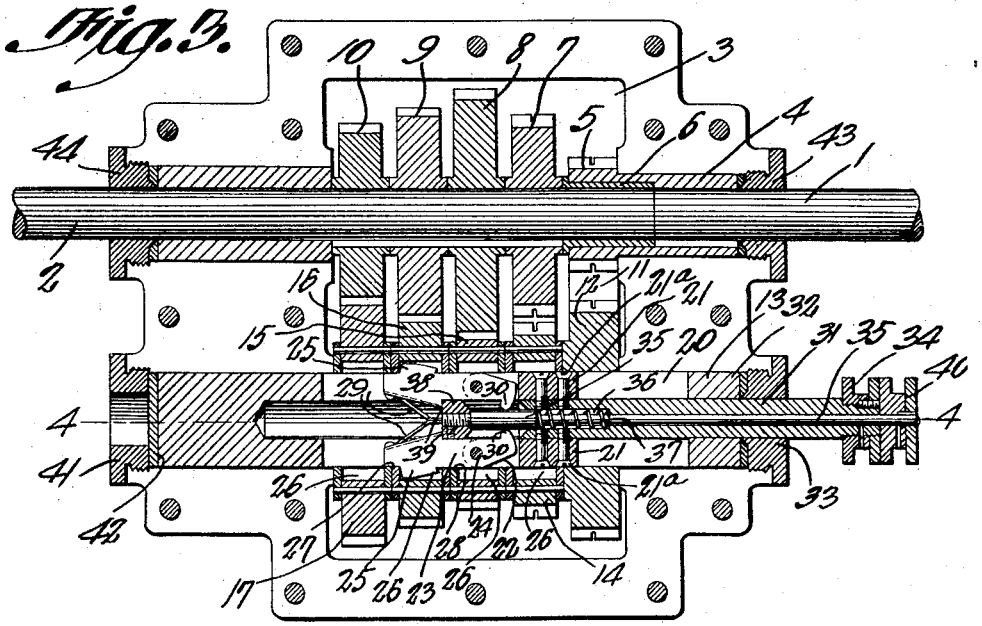
Figure 4:
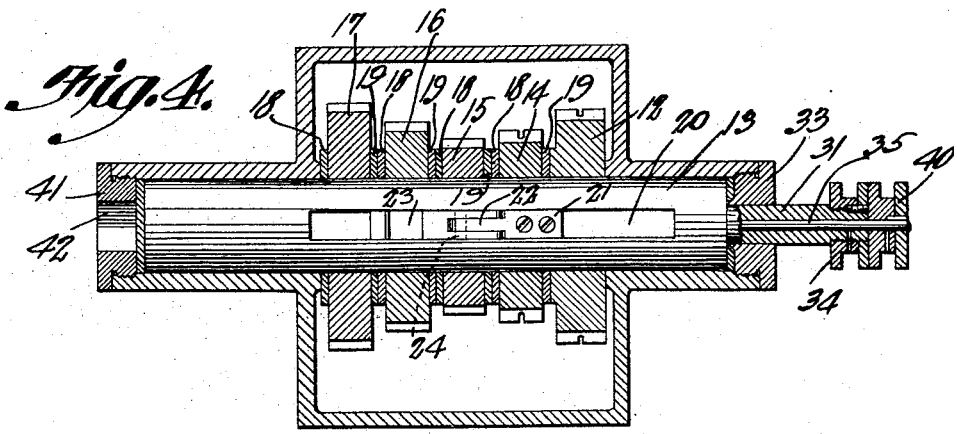

In the drawings—Figure 1 is a view illustrating the control mechanism of a casing the parts being in side elevation. Fig. 2 is a front end view thereof. Fig. 3 is a horizontal sectional view through the complete casing and the transmission parts thereof. Fig. 4 is a section taken on line 4—4 of Fig. 3. Fig. 5 is an enlarged detail view of the pivoted pawls or the power transmitting element engaging means.

Referring to the drawings, the numeral 1 designates a driving shaft, which as usual is connected through a clutch (not shown) to the prime mover, the same when in automobiles being the explosive engine; 2 the axially alined driven shaft, which is connected as usual through a differential gearing to the drive axle of the automobile; and 3 the transmission mechanism carrying casing.

Keyed upon and rotatable with the shaft 1 within the casing 3 is a sleeve 4 having a noiseless chain sprocket 5, the bushing 6 being incased in the sleeve 4 about the end of the driven shaft 2 and forming a bearing for the inner end thereof within the casing 3.

Keyed upon the shaft 2 within the casing 3, are the reverse noiseless sprocket wheel 7, the first speed gear 8, the intermediate speed gear 9, and the high speed gear 10. A noiseless chain 11 connects the drive sprocket 5 to the sprocket 12, which is keyed upon the counter shaft 13, mounted in the casing 3. By this means, the driving shaft 1 is at all times connected to the counter shaft, so that the rotation of the drive shaft will rotate the counter shaft. Freely rotatable upon the intermediate portion of the counter shaft 13 within the casing 3, are the reverse sprocket 14, and the forward gears 15, 16 and 17, a chain (not shown) of the noiseless type being disposed to connect the sprocket 7 of the driven shaft to the sprocket 14 of the counter shaft, while the gears 15, 16 and 17 are in mesh at all times with the gears 8, 9 and 10, respectively. The portion of the shaft 13 within the casing 3 is provided with the longitudinal slot 20, while formed in the adjacent portion of the hubs of the gears 14, 15, 16 and 17 are the diametrically disposed recesses or pawl receiving sockets 25, as clearly illustrated in Fig. 3.

Mounted for sliding movement within the slot 20 of the shaft 13, is a sectional block 21, which is connected by screws 21ª to the tubular rod 31, each one of the sections being provided with an arm 22, which has pivotally connected thereto, the selective connecting members or pawls 23. Each one of the respective pawls 23 is thus pivoted at 24 and is held in gear engaging position, as shown in Figs. 3 and 4, by means of the expansible flat double prong spring 29. Each pawl 23 is provided with a gear engaging portion 25, which is disposed to seat within its selected recess 26 of the selected gear, so that the portions 27 and 28 will abut the inner surfaces of the respective rings or washers 18 and 19, there being two of these connected to the respective opposed faces of the selective gears. These rings thus form in reality a hub extension to engage the shaft 13 and prevent any "knocking" due to the rotation of the counter shaft 13 and its slot 20 when passing the recesses 26.

Each of the respective locking members or pawls 23 is provided with the hooked inner portion 39, which forms an outer limiting means for the control member 38 carried upon the actuating rod 35. This actuating rod 35 is mounted for sliding movement within the tubular longitudinally slidable rod 31, which is secured fixedly to the sectional block 21 by means of the screws 21ª, as clearly illustrated in Fig. 3. The rod 31 is provided with the socket 36, in which is fitted the spring 37 upon the rod 35, said spring normally holding the cone or control member 38 forwardly in the position, as shown in Fig. 3, so as to permit the locking pawls 23 to be extended or projected to engage the selected gear.

Each of the respective locking members 23 is provided with the abutment 30 upon its inner end, said abutment being disposed to project between the sections of the block 21 to be engaged by the inclined faces of the cone 38, as the cone is reciprocated, such movement causing the gear engaging end 25 of the locking pawl 23 to be retracted within the slot 20 of the shaft 13 so that the block 21 may be moved in either direction to place the locking members or pawls in the next selected position, or to permit the spring 29 to project the locking pawls 23 into engagement with the selected gear.

In order to operate the sliding rod 35, to cause the retraction of the locking members or pawls 23, the grooved spool 40 is disposed upon the free end of the rod 35 and has attached thereto, as shown in Figs. 1 and 2, the yoked end 58 of the reciprocatory arm 57, said arm 57 being L-shaped in elevation and having its long terminal disposed for sliding movement between the plates 45', with its toothed portion 56 disposed to be controlled by the pivoted segment 54, the detail operation of which will be presently set forth.

Fastened to the outer end of the longitudinally slidable sleeve 31, is the grooved member 34, which is connected to the yoke end 53 of the depending arm 52, said depending arm 52 being mounted for sliding movement below the arm 57, as illustrated in Fig. 1. The arm 52 is operably connected at 51 to the manually controlled operating lever 49, the same being connected to the supporting means 47 carried by the casing 3. By this means, it will be seen that both arms 52 and 58 are disposed for simultaneous movement through the operation of the lever 49, but in order that the locking member 23 may be released primarily or initially before the arm 47 is operated, a lever 61 is pivoted to the operating lever 49, adjacent the hand gripping portion 50 as at 62—63, there being a link 60 connected at 56 to the toothed segment 56, so that when the hand grip portion of the lever 61 is moved toward the hand gripping portion 50 of the lever 49, the link 60 will be pulled upon and the arm 58 will be moved to the right, as viewed in Fig. 1. This action will cause the cone 38 to engage the inwardly projecting end 30 of the locking members or pawls 23, and thus retract such members and remove the gear engaging portions 25 from the recesses 26 of the then selected gear.

In order to lock, and release the link 60, while the lever 49 is manipulated to move both members 52 and 58, or when it is desirable to permit of the movement of the lever 49, a rod 64 is connected to the lever 61 at one end, and a pin 65 is disposed for sliding movement in the slot 66 and is connected to the other end of the rod 64. This pin carries the two oppositely disposed pawls 67, which are disposed to engage the teeth 46 of the two spaced arms 45. Thus it will be seen that the initial movement of the lever 61 toward the hand grip 50, moves the segment 54 and consequently pulls the rod 35 to cause the locking members or pawls 23 to be released, the continued movement of the lever 49 releasing the pawls 67, at which time the lever 49 can be moved in either direction to slide simultaneously both rods 35 and 31 to move the pawls 23 to the desired or selected position.

From the foregoing description, taken in connection with the drawings, it is evident that by providing a means for retracting the locking members or pawls 23, and maintaining the same in such retracted position, that the longitudinally slidable rod 31 may be manipulated to move the locking members in the desired selected position, so that the pawls or locking members 23 may be moved for instance from the reversing gear 14 to the high speed gear 17, without the necessity of successively or progressively engaging the intermediate gears, this feature being of the utmost importance, as it reduces the wear upon these parts and at the same time permits of a quick selection and one in which there is no danger of the locking members 23 engaging two adjacent gears simultaneously.

By interposing the washers or rings 18 and 19 between the respective rotatable gears upon the counter shaft, it is impossible for the projecting portions of the selecting locking members 23 to project within the recesses 26 when moving from one position to the other even though the mechanism for retracting the pawls or locking members 23 should slip.

What is claimed is:

1. A selective transmission mechanism, including a casing, a drive shaft journaled therein, a driven shaft journaled in the casing and disposed in axial alinement with the drive shaft, a counter shaft journaled in the casing and operably connected at all times to the drive shaft, a plurality of freely rotatable power transmitting members mounted upon the counter shaft within the casing, a similar number of coöperating power transmitting members keyed to the driven shaft within the casing, a collapsible selecting means carried slidably by the counter shaft for engagement with one of the power transmitting members at a time, said member being normally expanded, manually operated means for collapsing said member, and manually operated means for sliding the member when collapsed to a position for engagement with a selected power transmitting member of the counter shaft.

2. A selective transmission mechanism, including a casing, a drive shaft journaled therein, a driven shaft journaled in the casing and disposed in axial alinement with the drive shaft, a counter shaft journaled in the casing and operably connected at all times to the drive shaft, a plurality of freely rotatable power transmitting members mounted upon the counter shaft within the casing, a similar number of coöperating power transmitting members keyed to the driven shaft within the casing, a collapsible selecting means carried slidably by the counter shaft for engagement with one of the power transmitting members at a time, said member being normally expanded, manually operated means movable in one direction for collapsing the selecting means, and manually operable means for bodily moving the selecting means and the collapsing means so that the selecting member may be disposed in selected position.

3. A selective transmission mechanism, including a casing, a drive shaft journaled therein, a driven shaft also journaled therein and disposed in axial alinement to the drive shaft, a counter shaft journaled in the casing and operably connected at all times to the drive shaft, said counter shaft being provided with a transversely disposed slot extending the full length of the casing and terminating in a central bore through one end thereof, a plurality of freely rotatable power transmitting members carried by the counter shaft within the casing, a similar number of coöperating power transmitting members keyed to the driven shaft, a tubular rod slidably mounted in the bore of the counter shaft, a normally expansible collapsible selecting member carried upon one end of the tubular rod within the slot of the counter shaft, said selecting member being provided with means to engage one of the power transmitting members of the counter shaft at a time to lock the same for rotation with the counter shaft, a rod slidably mounted in the tubular rod and provided with means for collapsing the selecting member, manually controlled means for operating the last rod, and manually controlled means for operating the tubular rod.

4. A selective transmission mechanism, including a casing, a drive shaft journaled therein, a driven shaft also journaled therein and disposed in axial alinement to the drive shaft, a counter shaft journaled in the casing and operably connected at all times to the drive shaft, said counter shaft being provided with a transversely disposed slot extending the full length of the casing and terminating in a central bore through one end thereof, a plurality of freely rotatable power transmitting members carried by the counter shaft within the casing, a similar number of coöperating power transmitting members keyed to the driven shaft, a tubular rod slidably mounted in the bore of the counter shaft, a normally expansible collapsible selecting member carried upon one end of the tubular rod within the slot of the counter shaft, said selecting member being provided with means to engage one of the power transmitting members of the counter shaft at a time to lock the same for rotation with the counter shaft, a rod slidably mounted in the tubular rod and provided with means for collapsing the selecting member, manually controlled means for operating the last rod, manually controlled means for operating the tubular rod, means for locking both rods against sliding movement, and means for locking the tubular rod actuating means until the selecting member has been collapsed.

5. A selective transmission mechanism, including a casing, a drive shaft journaled therein, a driven shaft also journaled therein and disposed in axial alinement thereto, a counter shaft journaled in the casing parallel to the driving and driven shafts, a transmission device operably connecting the drive shaft to the counter shaft, a plurality of transmission members keyed upon the driven shaft, a similar number of coöperating transmission members rotatably mounted upon the counter shaft, each of the latter transmission members being provided with a key-way adjacent the counter shaft, said counter shaft being provided with a transverse slot extending the full length of the power transmitting member, a collapsible key slidably mounted in the transverse slot of the counter shaft, said key being normally expanded to engage the key way of a selective power transmitting member, manually controlled means for collapsing the key, and manually controlled means for sliding the key to selected position.

6. A selective transmission mechanism, including a casing, a driving shaft journaled therein, a driven shaft journaled therein and disposed in axial alinement thereto, a counter shaft journaled in the casing parallel to the driving and driven shafts, a transmission device operably connecting the drive shaft to the counter shaft, a plurality of transmission members keyed upon the driven shaft, a similar number of coöperating transmission members rotatably mounted upon the counter shaft, each of the latter transmission members being provided with a key-way adjacent the counter shaft, said counter shaft being provided with a transverse slot extending the full length of the power transmitting member, a collapsible key slidably mounted in the transverse slot of the counter shaft, said key being normally expanded to engage the key way of a selected power transmitting member, manually controlled means for collapsing the key, manually controlled means for sliding the key to selected position, and means for locking the last manually controlled means until the key has been collapsed.

In testimony that I claim the foregoing as my own, I have hereto affixed my signature in the presence of two witnesses.

ARTHUR R. ROGERS.

Witnesses:
E. B. SAWYER,
D. S. ANDREWS.

---

Copies of this patent may be obtained for five cents each, by addressing the "Commissioner of Patents, Washington, D. C."